United States Patent [19]
Ichimaru

[11] Patent Number: 5,364,122
[45] Date of Patent: Nov. 15, 1994

[54] VEHICLE SUSPENSION CONTROL SYSTEM WITH SEQUENTIAL CONTROL FLOW

[75] Inventor: Nobuyuki Ichimaru, Kanagawa, Japan

[73] Assignee: Tokico Ltd., Kawasaki, Japan

[21] Appl. No.: 41,196

[22] Filed: Apr. 1, 1993

[30] Foreign Application Priority Data

Apr. 3, 1992 [JP] Japan ................... 4-110663

[51] Int. Cl.⁵ .............................. B60G 11/26
[52] U.S. Cl. ................... 280/709; 280/714
[58] Field of Search ............ 280/709, 707, 703, 714, 280/840, 6.12

[56] References Cited

U.S. PATENT DOCUMENTS

| | | | |
|---|---|---|---|
| 4,865,347 | 9/1989 | Fukushima et al. | 280/707 |
| 5,016,909 | 5/1991 | Lin | 280/707 |
| 5,056,812 | 10/1991 | Takehara et al. | 280/709 |
| 5,058,017 | 10/1991 | Adachi et al. | 280/703 |
| 5,076,606 | 12/1991 | Takahashi | 280/709 |
| 5,135,065 | 8/1992 | Kawasaki et al. | 280/709 |
| 5,180,024 | 1/1993 | Eto | 280/707 |
| 5,257,814 | 11/1993 | Kohara | 280/707 |
| 5,263,737 | 11/1993 | Furuya et al. | 280/714 X |

*Primary Examiner*—Richard M. Camby
*Assistant Examiner*—Christopher P. Ellis
*Attorney, Agent, or Firm*—Wenderoth, Lind & Ponack

[57] ABSTRACT

A suspension control system for a vehicle includes a plurality of hydraulic cylinders interposed between the vehicle body and the respective axles of front right, front left, rear right and rear left wheels for controlling the vehicle height by the action of a hydraulic fluid charged into and discharged from the cylinders. A plurality of normally-closed charge-discharge valves are provided to correspond to respective of the hydraulic cylinders. When the hydraulic fluid is to be charged into or discharged from the hydraulic cylinders, among the charge-discharge valves, at least the left and right charge-discharge valves associated with either the front right and front left wheels or the rear right and rear left wheels are not opened simultaneously, but either of the left and right charge-discharge valves is selectively opened.

6 Claims, 8 Drawing Sheets

VEHICLE SUSPENSION CONTROL SYSTEM WITH SEQUENTIAL CONTROL FLOW

BACKGROUND OF THE INVENTION

The present invention relates to a suspension control system for a vehicle which may suitably be used for vehicle height control, for example.

There has heretofore been one type of control system that controls the height of a vehicle by extending and contracting hydraulic cylinders associated with the wheels of the vehicle. This type of control system is activated in response to a height designating signal input by a manual operation. Alternatively, the control system automatically controls the length of each hydraulic cylinder in response to a vehicle height signal from a vehicle height sensor.

The conventional control system of the type described above suffers, however, from the following problems. For example, in a vehicle wherein the distance between the vehicle body and front wheels is controllable, charge or discharge of the hydraulic fluid Is simultaneously carried out for two cylinders associated with the two front wheels. Therefore, these two cylinders are communicated with each other through the piping for the hydraulic fluid. Accordingly, when rolling occurs, the hydraulic fluid flows from the outer cylinder to the inner cylinder, thus aggravating the rolling. If the hydraulic fluid charge-discharge operation for the two cylinders is stopped by shutting off the hydraulic communication to the cylinders in the above-described state, the cylinders are locked in a state where the vehicle body is tilted thereby.

SUMMARY OF THE INVENTION

It is an object of the present invention to provide an improved vehicle suspension control system, which is free from the above-described problems of the prior art.

To attain the above-described object, the present invention provides a suspension control system for a vehicle including a plurality of vehicle height control members or means to be interposed between the body of the vehicle and the respective axles of front right, front left, rear right and rear left wheels for controlling the vehicle height by the action of a hydraulic fluid charged into and discharged from the vehicle height control means, and fluid supply means connected to each of the vehicle height control means through a piping to supply the hydraulic fluid to the vehicle height control means. The suspension control system further includes fluid discharge means provided in the piping to discharge the hydraulic fluid from the vehicle height control means, and a plurality of normally-closed charge-discharge valves provided in the piping to correspond to the plurality of vehicle height control means, respectively. The charge-discharge valves are opened when the hydraulic fluid is to be charged into or discharged from the vehicle height control means. The suspension control system is provided with charge-discharge valve selecting means operating so that when the hydraulic fluid is to be charged into or discharged from the vehicle height control means, among the charge-discharge valves, at least the left and right charge-discharge valves associated with the front wheels or at least the left and right charge-discharge valves associated with the rear right and rear left wheels are not opened simultaneously, but either of the left and right charge-discharge valves is selectively opened.

DETAILED DESCRIPTION

In aid of understanding of the present invention, a prior art first will be explained with reference to FIGS. 6 and 7.

In these figures, a hydraulic pump 1, which constitutes a fluid supply means, is driven by an electric motor 2 mounted on a vehicle to suck or draw in a fluid from a reservoir tank 3 and deliver it to a common line 4 as a pressurized hydraulic fluid. The distal end of the common line 4 branches out into, for example, four branch lines 4A, 4B, . . . (only two of them are shown in FIG. 6). The distal ends of the branch lines 4A, 4B, . . . are connected to hydraulic cylinders 6, 7, . . . , which will be described later.

A discharge valve 5, which serves as a fluid discharge means, is connected to an intermediate portion of the common line 4. The discharge valve 5 comprises a solenoid-controlled relief valve, and it is normally held in a valve closed position (a), as shown in FIG. 6, by the operation of a spring 5A. The discharge valve 5 is changed over from the valve closed position (a) to a valve open position (b) on the basis of a changeover signal delivered from a control unit 17 (described later) to discharge the hydraulic fluid from the hydraulic cylinders 6, 7, . . . to the reservoir tank 3. Further, the discharge valve 5 has a pilot line 5B so that when the pressure in the common line 4 becomes higher than a set pressure of the spring 5A, the discharge valve 5 opens to relieve the pressure into the reservoir tank 3.

Figure 6:
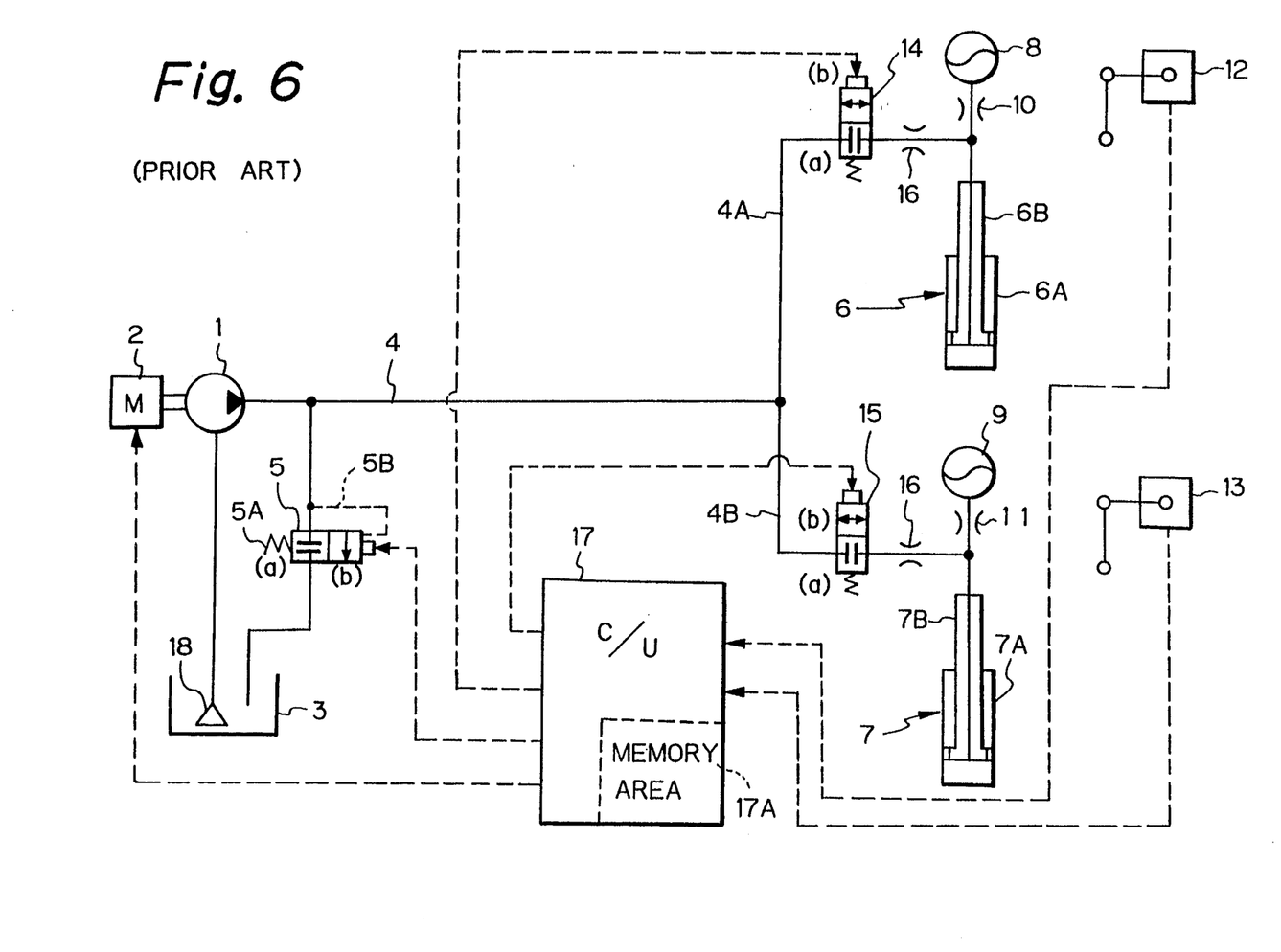
FIG. 6 is a hydraulic circuit diagram showing a prior art suspension control system.

Reference numerals 6 and 7 denote hydraulic cylinders, which serve as vehicle height control members or means interposed between the vehicle body and tile respective axles of wheels (in FIG. 6 are shown only the hydraulic cylinders associated with the front left and front right wheels). The hydraulic cylinders 6 and 7 constitute suspensions that suspend the vehicle body at the front left and front right wheels, respectively. In the hydraulic cylinders 6 and 7, rods 6B and 7B extend from and withdraw or retract into the respective tubes 6A and 7A in response to the charging and discharging of the hydraulic fluid, which is supplied from the hydraulic pump 1, thereby effecting vehicle height control and vehicle body attitude control. Although in FIG. 6 the hydraulic cylinders 6 and 7, which are provided for the front left and front right wheels, are shown, it should be noted that similar hydraulic cylinders (not shown) are provided for the rear left and rear right wheels and these cylinders are also connected to branch lines similar to the branch lines 4A and 4B.

Accumulators 8 and 9 are associated with the hydraulic cylinders 6 and 7, respectively. The accumulators 8 and 9 are connected to the hydraulic cylinders 6 and 7 through respective damping force valves 10 and 11 so as to act as gas springs that constantly bias the rods 6B and 7B of the hydraulic cylinders 6 and 7 in a direction in which the rods 6B and 7B extend. When the rods 6B and 7B of the hydraulic cylinders 6 and 7 extend and contract in response to external vibration, the hydraulic fluid flows between the hydraulic cylinders 6 and 7 and the accumulators 8 and 9. At this time, damping force is generated by the damping force valves 10 and 11, and thus the vibration is absorbed.

Vehicle height sensors 12 and 13 are provided for the front left and front right wheels. The vehicle height sensors 12 and 13 each detect the height of the vehicle body with respect to the axle at the front-wheel side of the vehicle and output the detection signal to a control unit 17.

Hydraulic fluid charge-discharge valves 14 and 15 are provided in respective intermediate portions of the branch lines 4A and 4B. The charge-discharge valves 14 and 15 comprise solenoid-controlled switching valves, and these valves are normally held in respective valve closed positions (a). The charge-discharge valves 14 and 15 are each changed over from the valve closed position (a) to a valve open position (b) in response to a control signal from the control unit 17, thereby allowing the hydraulic fluid to be charged into and discharged from the hydraulic cylinders 6 and 7. In addition, throttle valves 16 are provided in respective intermediate portions of the branch lines 4A and 4B at positions between the charge-discharge valves 14 and 15 on the one hand and the hydraulic cylinders 6 and 7 on the other. The throttle valves 16 regulate the flow rate of hydraulic fluid charged into and discharged from the hydraulic cylinders 6 and 7, thereby slowing down the extending and contracting speed of the rods 6B and 7B.

The control unit 17 comprises a microcomputer or the like. The control unit 17 is connected at the input side thereof to the vehicle height sensors 12 and 13, a vehicle speed sensor (not shown), and a steering sensor (not shown). The output side of the control unit 17 is connected to the electric motor 2, the discharge valve 5, and the charge-discharge valves 14 and 15. The control unit 17 has a program as shown in FIG. 7 and other necessary data in a memory circuit to execute vehicle height control processing and other processing. The memory circuit of the control unit 17 has a memory area 17A stored with reference data for vehicle height judging processing.

Further, a filter 18 is provided in the reservoir tank 3. The filter 18 removes dust and other foreign matter from the fluid in the reservoir tank 3, thus enabling a cleaned fluid to be sucked or drawn into the hydraulic pump 1.

The vehicle height control processing executed by the control unit 17 in the prior art vehicle suspension control system, arranged as described above, will be explained below with reference to FIG. 7.

When the power supply switch (not shown) is turned on to start a processing operation, various values are initialized at Step 1, and it is judged at Step 2 whether or not the time of a control cycle of the order of several ms has elapsed. If YES, detection signals are read from the vehicle height sensors 12, 13 and other sensors at Step 3.

Then, it is judged at Step 4 whether or not the vehicle height is high or low on the basis the detection signals from the vehicle height sensors 12, 13, . . . In accordance with the result of such judgment, charge and discharge flags are set or cleared. Then, the process proceeds to Step 5 where a hydraulic fluid charge-discharge operation is executed as follows.

That is, if it is judged at Step 4 that the vehicle height is low, the charge flags for the front right wheel (hereinafter referred to as "FR"), the front left wheel (hereinafter referred to as "FL"), the rear right wheel (hereinafter referred to as "RR") and the rear left wheel (hereinafter referred to as "RL") are set (flags=1). Then, on the basis of the states of the flags, a drive signal is output to the electric motor 2 to drive the hydraulic pump 1 by the electric motor 2 at the subsequent Step 5. In addition, control signals are output to the charge-discharge valves 14, 15, . . . so as to open them to supply the hydraulic fluid from the hydraulic pump 1 to the hydraulic cylinders 6, 7, . . . , thereby extending the rods 6B, 7B, . . . of the hydraulic cylinders 6, 7, . . . to raise the vehicle height. When the vehicle height reaches a predetermined level, the charge flags for FR, FL, RR and RL are cleared (flags=0). Consequently, the output of the drive and control signals is suspended. As a result, the operation of the hydraulic pump 1 is suspended, and the charge-discharge valves 14, 15, . . . are closed.

On the other hand, if it is judged at Step 4 that the vehicle height is high, the discharge flags for FR, FL, RR and RL are set. Then, on the basis of the states of the flags, a changeover signal is output so as to change over the discharge valve 5 to the valve open position (b) at the subsequent Step 5, and the charge-discharge valves 14, 15, . . . are changed over to the respective valve open positions (b) so as to discharge the hydraulic fluid from the hydraulic cylinders 6, 7, . . . to the reservoir tank 3, thereby contracting the rods 6B, 7B, . . . of the hydraulic cylinders 6, 7, . . . to lower the vehicle height. When the vehicle height reaches a predetermined level, the discharge flags of FR, FL, RR and RL are cleared. Consequently, the discharge valve 5 and the charge-discharge valves 14, 15, . . . are changed over to the respective valve closed positions (a), thus blocking the discharge of the hydraulic fluid from the hydraulic cylinders 6, 7, . . .

Figure 7:
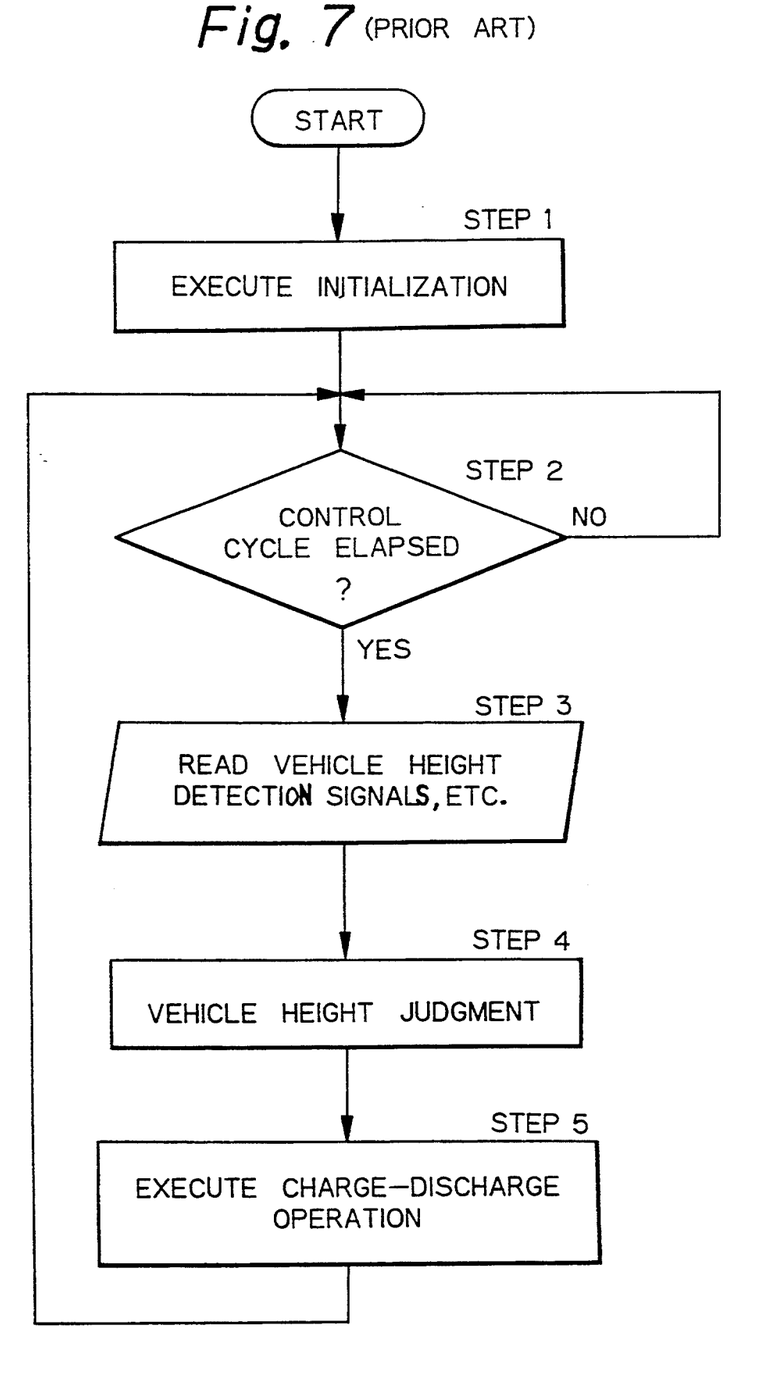
FIG. 7 is a flowchart showing vehicle height control processing executed by the prior art.

When a vehicle height changeover switch (not shown) is actuated to change the vehicle height during running or operation of the vehicle, processing based on the program shown in FIG. 7 is also executed, thereby allowing the vehicle height to be adjusted to a desired level. If it is judged during such vehicle height control that the vehicle is turning on the basis of a detection signal from the steering sensor or other sensor, the supply of the hydraulic fluid to the hydraulic cylinders 6, 7, . . . is stopped to suspend the vehicle height control.

Incidentally, in the above-described prior art arrangements, a relatively small-sized motor is used as the electric motor 2 mounted on the vehicle in order to achieve a reduction in the overall weight. For this reason, the capacity of the hydraulic pump 1 cannot substantially be increased. Accordingly, when the vehicle height is to be raised during running of the vehicle, about 30 seconds is required to extend all the rods 6B, 7B, . . . of the hydraulic cylinders 6, 7, . . .

Therefore, when it is detected that the vehicle is turning during the vehicle height control, there may be a lag between the time the turning of the vehicle is detected and the time the charge-discharge valves 14, 15, ... are closed, although the system is arranged so that the charge-discharge operation for the hydraulic cylinders 6, 7, ... is suspended on such an occasion. In this case, since the vehicle rolls in such a manner that the rod 6B of the hydraulic cylinder 6 is contracted, whereas the rod 7B of the hydraulic cylinder 7 is extended, for example, by the inertia acting on the vehicle body during the turning of the vehicle, the hydraulic fluid in the hydraulic cylinder 6 undesirably flows into the hydraulic cylinder 7 through the branch lines 4A and 4B before the charge-discharge valves 14 and 15 are closed.

Accordingly, in the prior art arrangements the rolling phenomenon that occurs during the turning of the vehicle causes the rods 6B and 7B of the hydraulic cylinders 6 and 7, for example, to contract and extend, respectively, resulting in a difference in the degree of extension of the rods 6B and 7B. Thus, the rolling is aggravated. When the charge-discharge valves 14 and 15 are closed, the rods 6B and 7B are maintained in the above-described conditions with the vehicle body tilted. Thus, the tilt of the vehicle body caused by rolling cannot be restored. In addition, the prior art arrangements also aggravates squat and dive at the time of starting and stopping the vehicle.

In view of the above-described problems of the prior art, it is an object of the present invention to provide a vehicle suspension control system wherein the hydraulic fluid charge-discharge operation is individually carried out for each vehicle height control means, thereby making it possible to prevent the hydraulic fluid from flowing from one vehicle height control means to another during turning of the vehicle, and thus solving the problems attendant to the prior art arrangement, i.e., aggravation of rolling, failure to restore the vehicle body from a tilted position caused by rolling, etc.

The present invention provides a vehicle suspension control system having charge-discharge valve selecting means operating so that when the hydraulic fluid is to be charged into or discharged from the plurality of vehicle height control means, the charge-discharge valves are selectively and sequentially opened one by one with the other charge-discharge valves closed.

With the above-described arrangement, the charge-discharge valves can be individually opened and closed in a predetermined sequence. Accordingly, it is possible to prevent a plurality of charge-discharge valves from opening at the same time and hence possible to eliminate the occurrence of a situation where the hydraulic fluid undesirably circulates between the vehicle height control means.

Embodiments of the present invention will be described below with reference to FIGS. 1 to 5B. It should be noted that in such embodiments arrangements same constituent elements as those in the prior art shown in FIG. 6 are denoted by the same reference numerals and description thereof is omitted.

Figure 1:
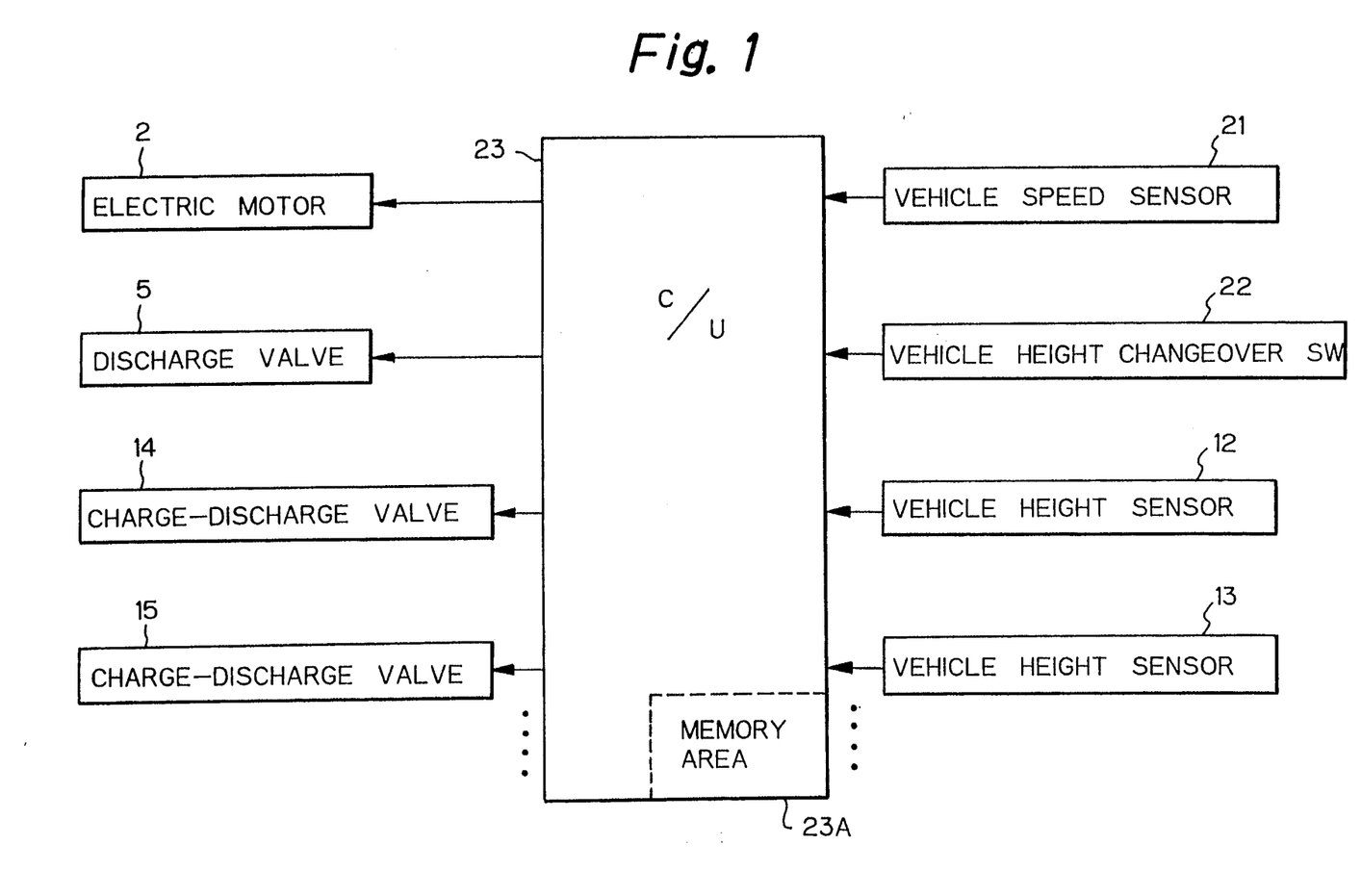
FIG. 1 is a block diagram of one embodiment of the suspension control system according to the present invention.

Referring to such figures, a vehicle speed sensor 21 detects the traveling speed of the vehicle. A vehicle height changeover switch 22 is manually operable by the driver of the vehicle. The vehicle height changeover switch 22 is actuated to change the vehicle height in accordance with the road surface condition or driver's preference. For example, the vehicle height can be selected between "high position" and "low position".

Figure 2:
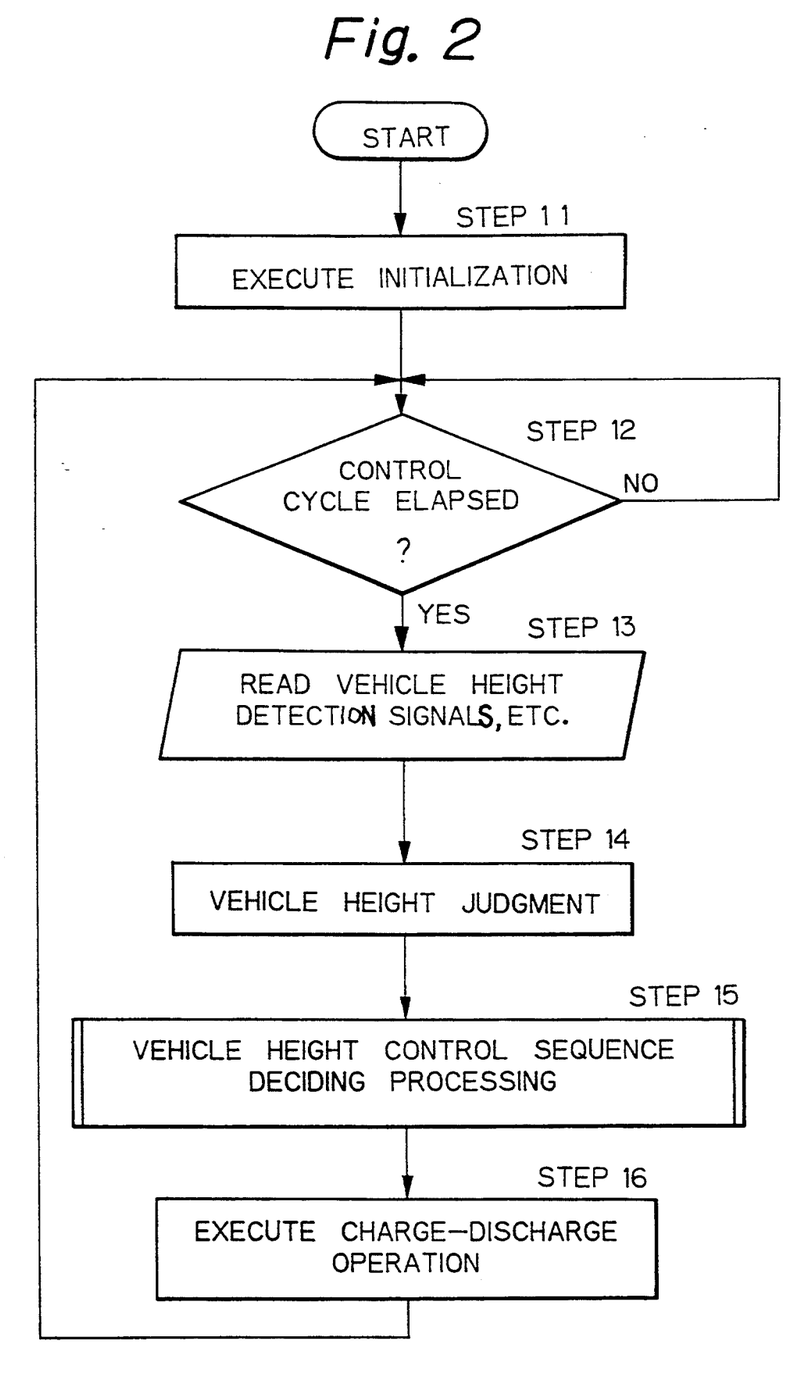
FIG. 2 is a flowchart showing vehicle height control processing.
Figure 3:
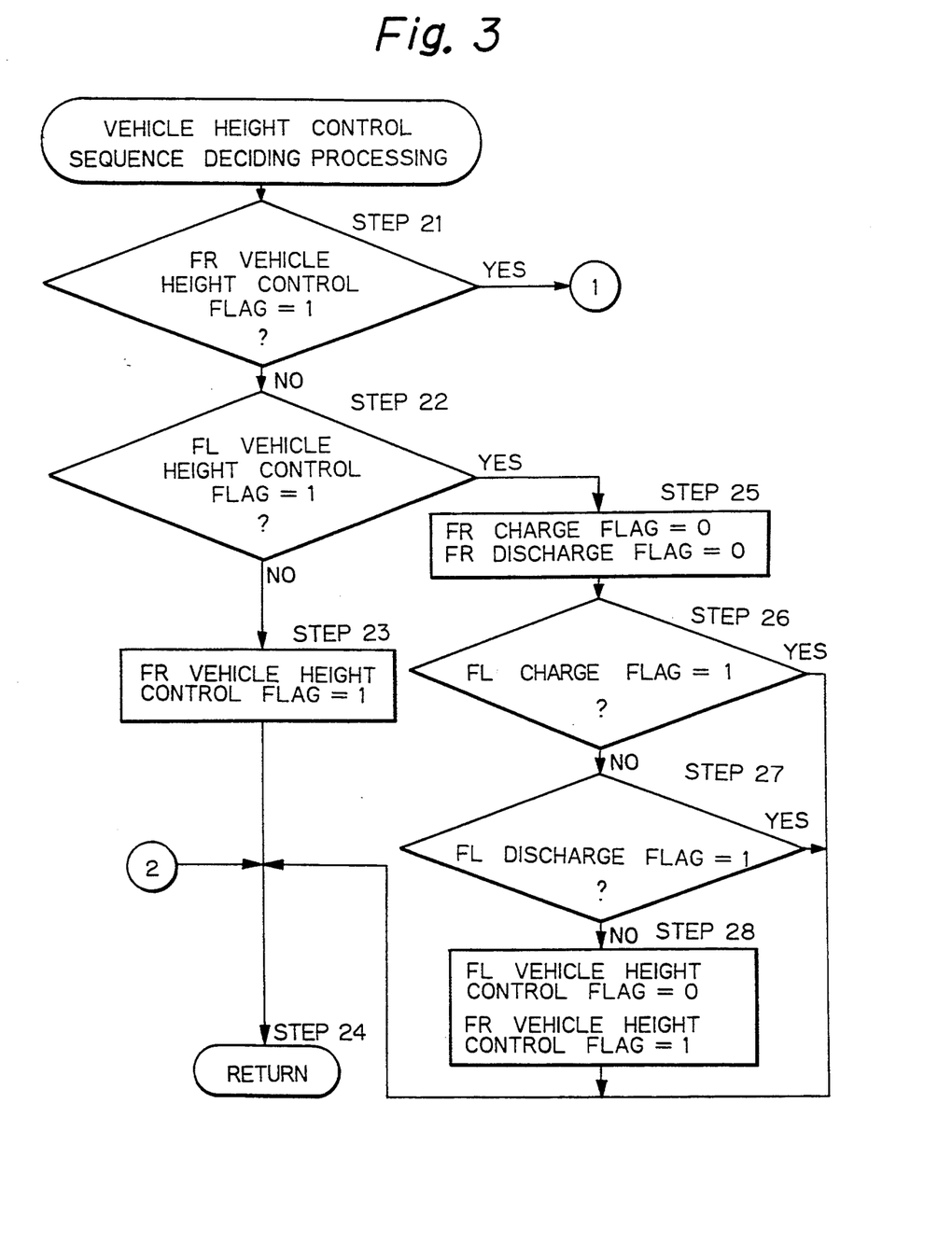
FIG. 3 is a flowchart showing vehicle height control sequence deciding processing.
Figure 4:
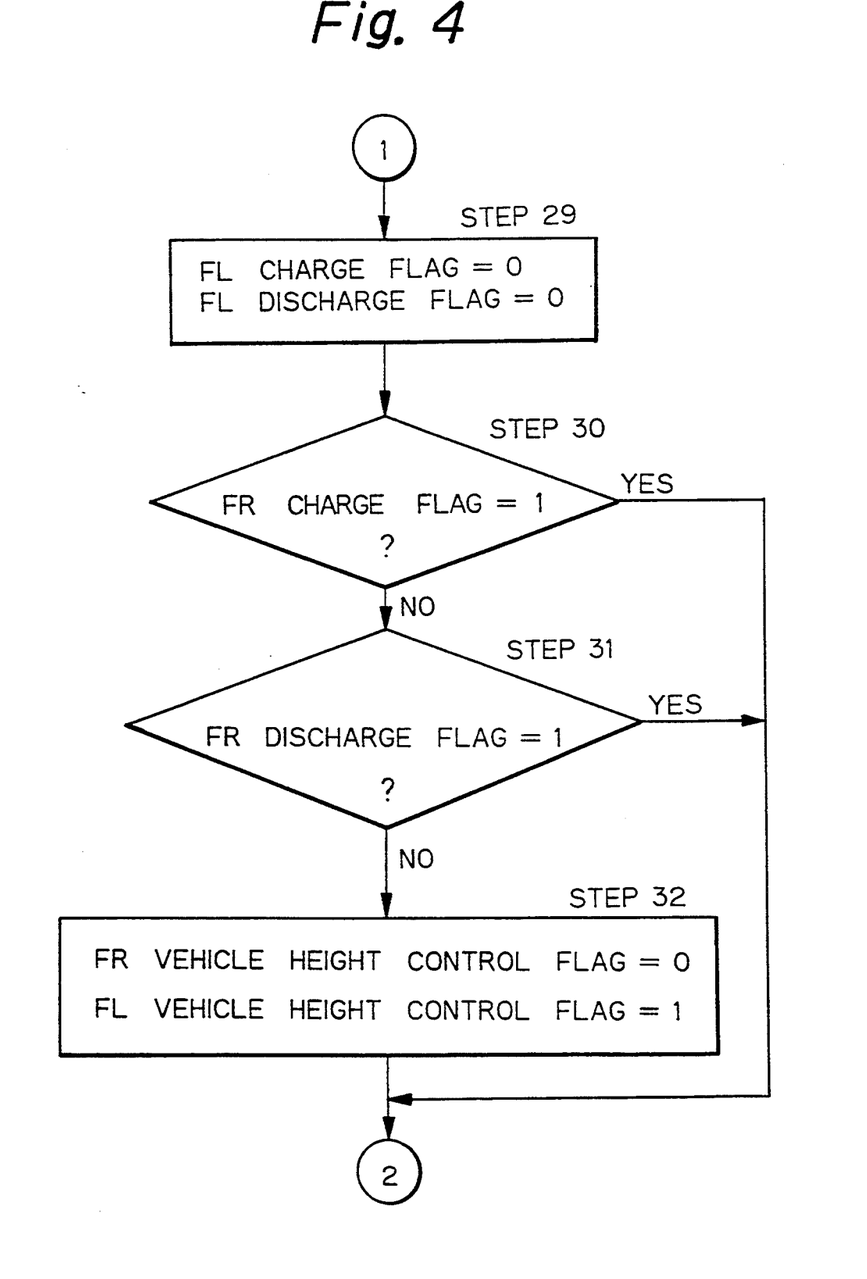
FIG. 4 is a flowchart following FIG. 3.

A control unit 23 is constructed of a microcomputer or the like in substantially the same way as in the case of the control unit 17 described in connection with the prior art arrangement. The control unit 23 has a memory circuit stored with programs as shown in FIGS. 2 to 4 to execute vehicle height control processing and vehicle height control sequence deciding processing. The memory circuit of the control unit 23 has a memory area 23A stored with reference data for vehicle height judgment made in accordance with a changeover signal from the vehicle height changeover switch 22, an FR vehicle height control flag, an FL vehicle height control flag, etc.

The vehicle suspension control system according to this embodiment has the above-described arrangement, and the basic operation thereof is not particularly different from that of the prior art arrangements.

Therefore, the vehicle height control processing and vehicle height control sequence deciding processing executed by the control unit 23, which are features of this embodiment, will be explained below with reference to FIGS. 2 to 4.

When a processing operation starts, processing from Step 11 to Step 14 is executed in substantially the same way as in the processing from Step 1 to Step 4, shown in FIG. 7, which have been described in connection with the prior art arrangements. Then, vehicle height control sequence deciding processing, which constitutes the charge-discharge valve selecting means, is executed at Step 15, as shown in FIGS. 3 and 4. It should be noted that at Step 11 initialization is executed so that the condition of "FR vehicle height control Flag=0" and "FL vehicle height control flag=0" is attained.

In the vehicle height control sequence deciding processing, the charge-discharge valves 14 and 15, shown in FIG. 6, are sequentially and selectively opened and closed, thereby inhibiting both of them from opening simultaneously during the vehicle height control.

First, it is Judged at Step 21 whether or not the FR vehicle height control flag has been set (flag=1). If NO, the process proceeds to Step 22 where it is judged whether or not the FL vehicle height control flag has been set (flag=1). If NO, the process proceeds to Step 23 where the FR vehicle height control flag is set, and the process then returns through Step 24 to the main routine, shown in FIG. 2, to execute processing at Step 16.

Then, the process returns to Step 12 where it is judged whether or not the control cycle of the order of several ms has elapsed. If YES, the processing operations at Steps 13 and 14 are executed. Then, the process returns to Step 21, shown in FIG. 3, where it is judged whether or not the FR vehicle height control flag has been set. If YES is the answer at Step 21, the FL charge and discharge flags are cleared at Step 29, shown in FIG. 4. Thus, even if the FL charge or discharge flag has been set at Step 14, it is cleared at Step 29. Therefore, there is no possibility that the vehicle height control for FL will be executed at Step 16, shown in FIG. 2.

Then, it is judged at Step 30 whether or not the FR charge flag is "1". If YES, the process shifts to Step 24 and then returns to Step 16, shown in FIG. 2. At Step 16, on the basis of the fact that the FR charge flag has been set, the hydraulic pump 1 is driven by the electric motor 2, and the charge-discharge valve 14 is changed over to the valve open position (b) to supply the hydraulic fluid to the FR hydraulic cylinder 6.

If NO is the answer at Step 30, the process proceeds to Step 31 where it is judged whether or not the FR discharge flag is "1". If YES, the process shifts to Step 24 and then returns to Step 16, shown in FIG. 2, in the same way as the above. At Step 16, on the basis of the fact that the FR discharge flag has been set, the discharge valve 5 is opened, and the charge-discharge valve 14 is changed over to the valve open position (b) to discharge the hydraulic fluid from the FR hydraulic cylinder 6. At the same time, since the selective control is not achieved in this embodiment for the rear wheels, the hydraulic fluid charge-discharge operation is directly executed for the rear hydraulic cylinders on the basis of the RR and RL charge and discharge flags.

On the other hand, if NO is the answer at Step 31, this means that both the FR charge and discharge flags are "0". Therefore, it may be Judged that vehicle height control for FR is not needed or it has already been executed. Accordingly, the process proceeds to Step 32 where the FR vehicle height control flag is cleared, and the FL vehicle height control flag is set. Thereafter, the process shifts to Step 24 and then returns to Step 16, shown in FIG. 2.

If NO is the answer at Step 21 while YES is the answer at Step 22, the process shifts to Step 25 where the FR charge and discharge flags are cleared. Thus, even if the FR charge or discharge flag has been set at Step 14, it is cleared at Step 25. Therefore, there is no possibility that the vehicle height control for FR will be executed at Step 16, shown in FIG. 2.

Next, processing operations similar to those at Steps 30 and 31 are executed at Steps 26 and 27. Then, the hydraulic fluid charge-discharge operation for the FL hydraulic cylinder 7 is executed at Step 16, shown in FIG. 2. If NO is the answer at both Steps 26 and 27, it may be judged that vehicle height control for FL is not needed or it has already been executed. Therefore, the process proceeds to Step 28 where the FL vehicle height control flag is cleared, while the FR vehicle height control flag is set. Thereafter, the process shifts to Step 24 and then returns to Step 16, shown in FIG. 2.

Thus, according to this embodiment, when vehicle height control is to be executed by actuating the vehicle height changeover switch 22 during running of the vehicle, for example, the charge-discharge valves 14 and 15 can be selectively and sequentially opened and closed, and it is possible to inhibit both of them from opening at the same time. Accordingly, it is possible to effect vehicle height control sequentially in such a manner that after vehicle height control for FR has been executed by charging or discharging the hydraulic fluid into or from the FR hydraulic cylinder 6, vehicle height control for FL is effected by carrying out a hydraulic fluid charge-discharge operation for the FL hydraulic cylinder 7. Thus, it is possible to surely prevent the hydraulic fluid from circulating between the hydraulic cylinders 6 and 7 when the vehicle is turning.

Thus, since in this embodiment the charge-discharge valves 14 and 15 are selectively opened and closed, it is possible to effectively prevent occurrence of problems, i.e., aggravation of rolling, and failure to restore the vehicle body from the tilted condition caused by rolling, which are likely to occur during turning of the vehicle, and squat and dive at the time of starting and stopping the vehicle. Accordingly, the reliability of the suspension control system is enhanced. In addition, it is unnecessary to detect whether or not the vehicle is turning by using a steering sensor, an acceleration sensor, etc. so as to inhibit the charging and discharging of the hydraulic fluid in order to suspend the vehicle height control operation during turning of the vehicle as in the prior art. Thus, vehicle height control can be properly effected all the time when the vehicle is running.

Further, when the vehicle is running at low speed or at rest, it will not roll. Therefore, the system may be arranged such that when it is detected that the vehicle is running at low speed on the basis of the detection signal from the vehicle speed sensor 21, the vehicle height control sequence deciding processing is omitted, but control processing similar to that in the prior art is executed instead, and only when the vehicle is running at a relatively high speed is, the vehicle height control sequence deciding processing described above executed.

Although in the described embodiment vehicle height control is selectively and sequentially executed only for the front left and right wheels of the vehicle, it should be noted that the present invention is not necessarily limited thereto and that vehicle height control may be selectively and sequentially executed for all the wheels, that is, the front left, front right, rear left and rear right wheels.

Figure 5A:
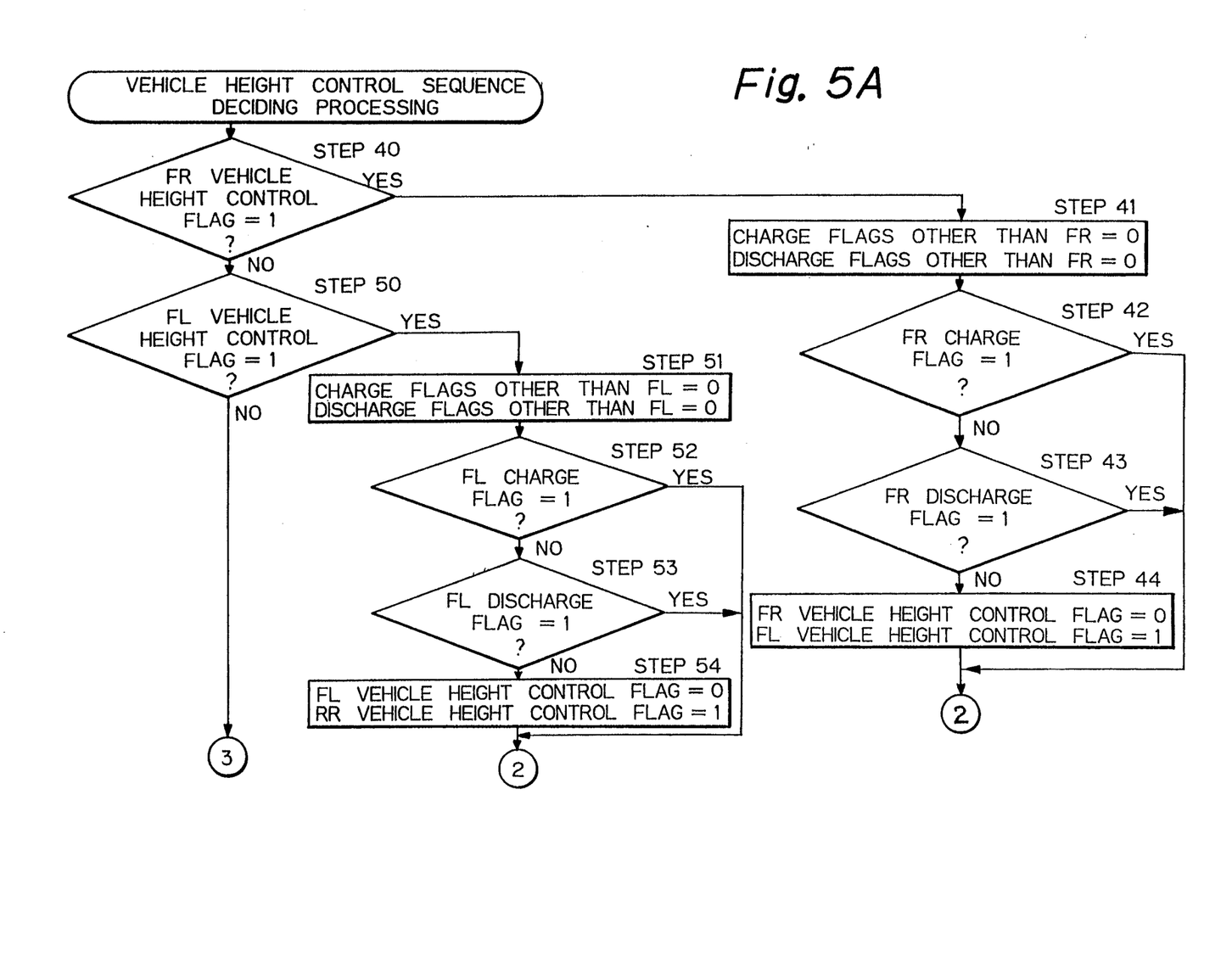
FIGS. 5A and 5B show in combination a flowchart showing control processing in which the processing shown in FIGS. 3 and 4 is applied to all the four wheels.
Figure 5B:
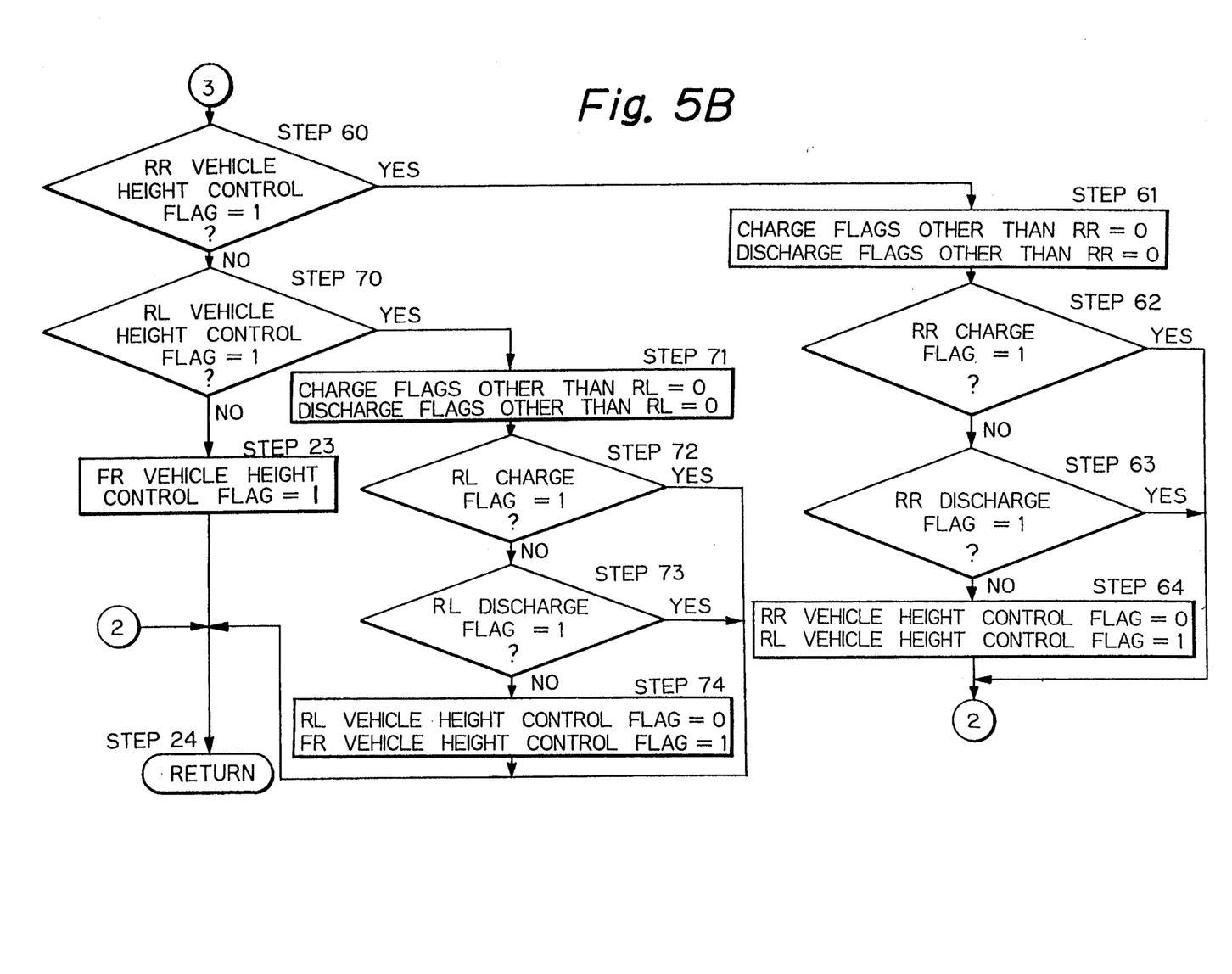

In such case, it is only necessary to replace the control procedure shown in FIG. 3 in the above-described embodiment with the control procedure shown in FIGS. 5A and 5B. Only the points in which the control procedure shown in FIGS. 5A and 5B differs from that shown in FIG. 3 will be explained below.

If it is judged at Step 40 that the FR vehicle height control flag has been set, all the charge and discharge flags other than those of FR for which the charge-discharge operation is to be carried out this time are cleared at Step 41. Then, processing at Steps 42 and 43 is executed in the same way as at Steps 26 and 27, shown in FIG. 3, and the process proceeds through Step 24 to Step 16, shown in FIG. 2, where the charge-discharge operation is executed. Thus, vehicle height control for FR is first effected. Upon completion of the vehicle height control for FR (when it is judged at Steps 42 and 43 that both the FR charge and discharge flags have been cleared), the FR vehicle height control flag is cleared, while the vehicle height control flag of FL for which vehicle height control is to be carried out next time is set at Step 44. Then, the process proceeds through Step 24 to Step 16, shown in FIG. 2.

When the process enters the subroutine shown in FIGS 5A and 5B next time, since the FR vehicle height control flag has already been cleared, NO is the answer at Step 40, and the process then proceeds to Step 50. At steps 51 to 54, control processing similar to that at Steps 41 to 44 is executed for FL. Thus, vehicle height control for FL is effected. Similarly, vehicle height control for RR is carried out at Steps 60 to 64, and vehicle height control for RL is effected at Steps 70 to 74. Thus, vehicle height control is repeatedly executed for FR, FL, RR and RL in the mentioned order.

Although in the foregoing embodiments the vehicle height control means is comprised of the hydraulic cylinders 6 and 7, air springs, e.g., air suspensions, may be used as vehicle height control means in place of the hydraulic cylinders 6 and 7.

Although in the foregoing embodiments the vehicle height control sequence deciding processing is arranged such that the sequence of vehicle height control processing is decided for wheels selected from among those which have been subjected to vehicle height Judging processing, it should be noted that the vehicle height control sequence deciding processing is not necessarily limited thereto. For example, if may be arranged such that the sequence in which vehicle height detecting signals are to be read is decided, and vehicle height judging processing and a charge-discharge operation are executed for one of the vehicle height detecting signals read in the signal read sequence. The essential thing is to select sequentially one from among the four wheels and to execute vehicle height control processing for one wheel at a time.

As has been detailed above, according to the present invention, when a hydraulic fluid charge-discharge operation is to be carried out for a plurality of vehicle height control means interposed between respective axles of wheels and vehicle body, the charge-discharge valves are selectively and sequentially opened one by one with the other charge-discharge valves closed, so that the hydraulic fluid charge-discharge operation is sequentially carried out for the vehicle height control means. Accordingly, it is possible to surely prevent the hydraulic fluid from circulating between the vehicle height control means during turning of the vehicle. Thus, it is possible to eliminate occurrence of problems such as aggravation of rolling and failure to restore the tilt of the vehicle body caused by rolling. In addition, it is unnecessary to suspend the vehicle height control when the vehicle is turning.

Although the present invention has been described through specific terms, it should be noted here that the described embodiments are not necessarily exclusive and that various changes and modifications may be imparted thereto without departing from the scope of the invention which is limited solely by the appended claims.

What is claimed is:

1. A suspension control system for a vehicle, said system comprising:
   a plurality of vehicle height control members to be interposed between a body of the vehicle and respective axles of front right, front left, rear right and rear left wheels to control height of the vehicle by the action of a fluid charged into and discharged from said vehicle height control members;
   a pump;
   a main fluid line connected to said pump;
   a discharge valve provided in said main fluid line and adapted to discharge fluid from said main fluid line when said discharge valve is opened;
   a plurality of branch lines connecting said main fluid line to respective said vehicle height control members;
   each said branch line having therein a respective charge-discharge valve, each said charge-discharge valve being normally closed to isolate the respective said vehicle height control member from said main fluid line, and each said charge-discharge valve being opened so that the fluid is charged into the respective said vehicle height control member when said pump is operated and discharged from the respective said vehicle height control member when said discharge valve is opened; and
   a control unit for controlling charge and discharge of the fluid into and from said vehicle height control members, said control unit controlling said charge-discharge valves such that with respect to at least one of a set of said charge-discharge valves associated with the front wheels and a set of said charge-discharge valves associated with the rear wheels, said charge-discharge valves associated with the right and left wheels are never open at the same time.

2. A vehicle suspension control system according to claim 1, wherein said control unit controls said charge-discharge valves such that all said charge-discharge valves associated with the front right, front left, rear right and rear left wheels are never open at the same time.

3. A vehicle suspension control system according to claim 2, wherein said vehicle height control members are hydraulic cylinders supplied with a hydraulic fluid.

4. A vehicle suspension control system according to claim 2, wherein said vehicle height control members are air springs supplied with compressed air.

5. A vehicle suspension control system according to claim 1, wherein said vehicle height control members are hydraulic cylinders supplied with a hydraulic fluid.

6. A vehicle suspension control system according to claim 1, wherein said vehicle height control members are air springs supplied with compressed air.

* * * * *